Figure 3:
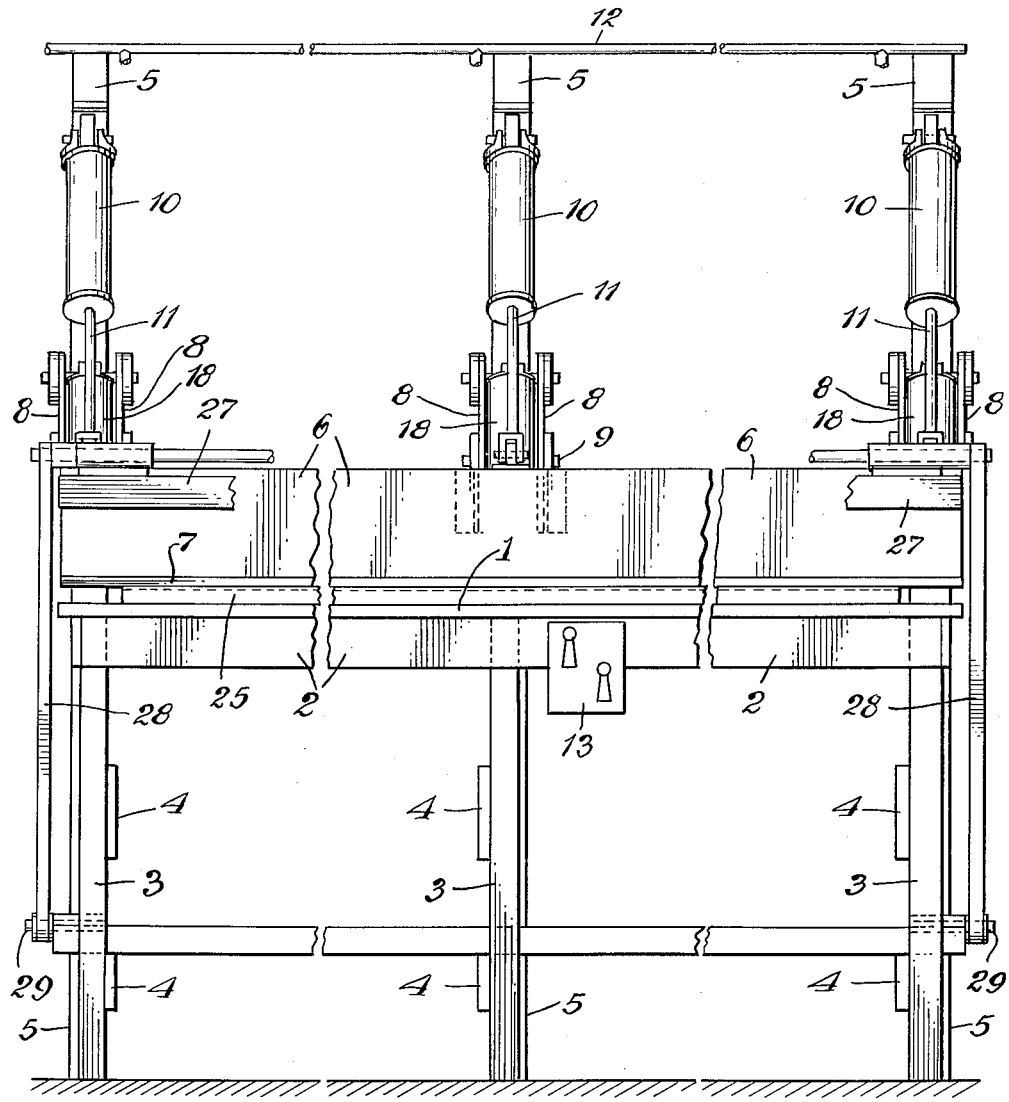

April 3, 1962 — E. R. PETERSON ET AL — 3,028,275
POST FORMING PRESS
Filed Jan. 8, 1957 — 3 Sheets-Sheet 1
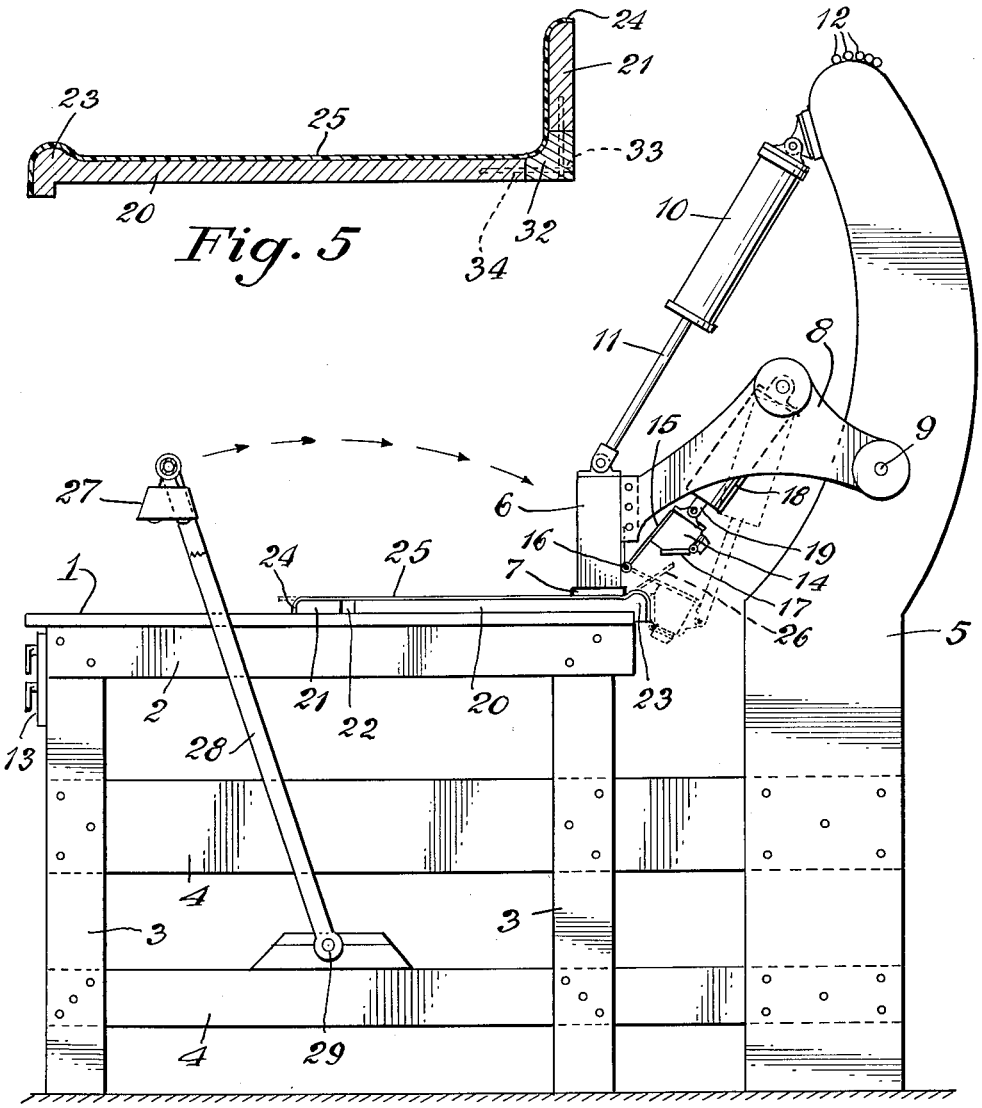
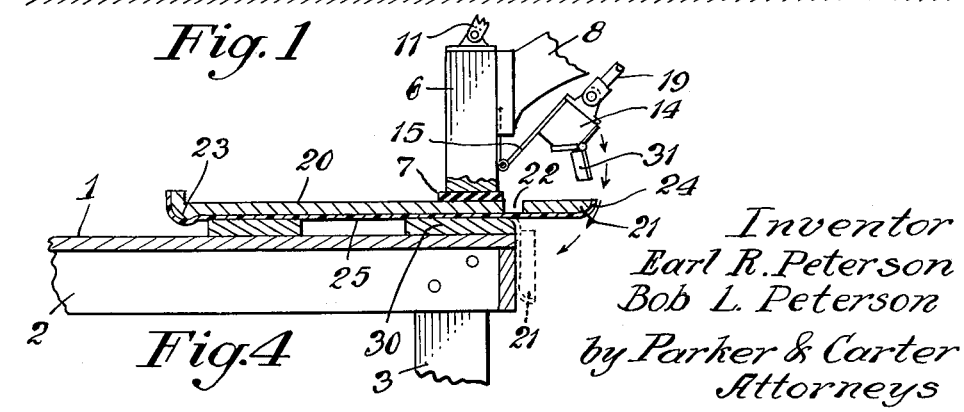
Inventor
Earl R. Peterson
Bob L. Peterson
by Parker & Carter
Attorneys

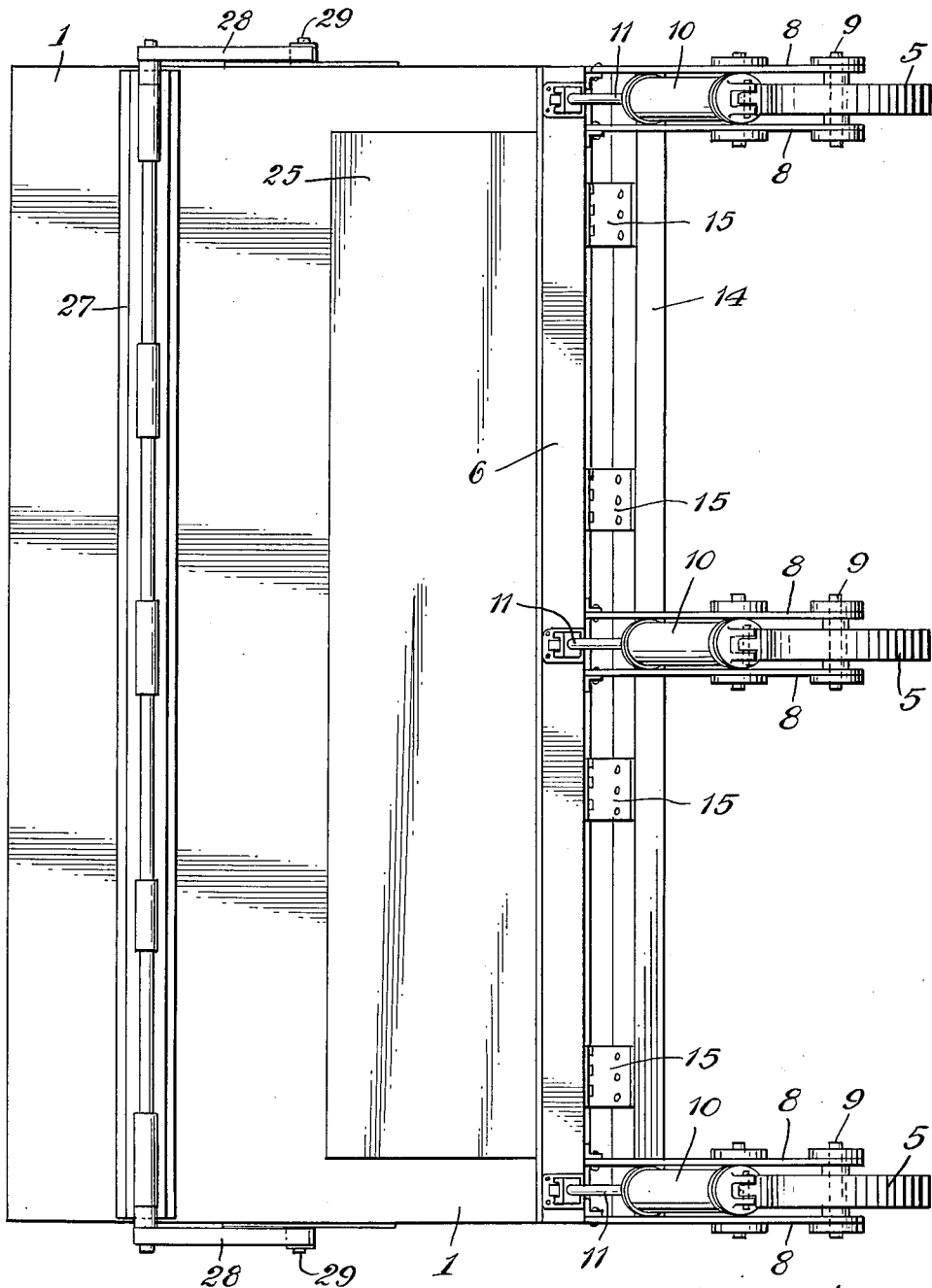

Inventor
Earl R. Peterson
Bob L. Peterson
by Parker & Carter
Attorneys 3,028,275
POST FORMING PRESS
Earl R. Peterson and Bob L. Peterson, both of
P.O. Box 32, McHenry, Ill.
Filed Jan. 8, 1957, Ser. No. 633,120
8 Claims. (Cl. 156—486)

Our invention relates to improvements in post forming press and method of post forming plastic objects and has for one object to permit the simultaneous forming and assembling of flat plastic sheets on the shaped core with which they are to be laminated to form a unit structure.

The practice heretofore has consisted in shaping the plastic cover and then inserting and cementing the core pieces, thus making it necessary to have a separate forming die for the plastic sheet and to separately assemble the formed sheet with the core. We propose to use the core as the forming die to apply the cover or sheet as a flat piece, cementing it to that part of the core that is flat, then forming the sheet about the non-flat portions of the core and then having changed the relative positions of the core pieces, increasing the clearance between them as the sheet bends. We propose to fill that space with a filler which will hold the parts in fixed position thereby substantially increasing the speed of manufacture and very greatly decreasing the cost.

Another object of the invention is to provide method of and apparatus for forming composite wood and plastic counter sheets and the like.

The practice heretofore prevalent in connection with the manufacture of plastic counter or table covers and the like has been to first form from a relatively thin plastic sheet to the shape desired for the cover and to then assemble the preformed plastic sheet with the pre-formed core. On the other hand, the method and apparatus we propose includes first forming the core of wood or other suitable material giving it in part at least the desired contour and in thereafter using the core as the core or base about and upon which the plastic sheet is to be formed so that the plastic sheet having been bent or shaped to conform to the core remains in situ as part of the laminated body.

Other objects will appear from time to time throughout the specification and claims.

The invention is illustrated more or less diagrammatically in the accompanying drawings, wherein FIGURE 1 is an end elevation of a post forming press;
FIGURE 2 is a plan view;
FIGURE 3 is a side elevation;
FIGURE 4 is a detail section illustrating a slightly different part of the operation;
FIGURE 5 is an enlarged section of the finished product.

Like parts are indicated by like characters throughout the specification and drawings.

A press platen 1 is supported on a rectangular framework 2 and vertical legs 3. Cross bars 4 tie the legs 3 together and support behind the platen 1 a plurality of upwardly extending columns 5 spaced away from the rear edge of the platen. The press bar 6 carrying at its bottom a pressure shoe of rubber or similar material 7 is supported on levers 8 pivoted on the columns 5 at 9. Air cylinders 10 pivoted on the columns 5 have piston rods 11 pivoted on the upper edge of the press bar 6. These are two-way air cylinders connected to an intake and exhaust pipe system 12 whereby air may be admitted to the cylinder to rotate the levers 8 in a clockwise direction to raise the press bar 6 or to rotate the levers 8 in a counter clockwise direction to lower the press bar 6. The particular source of pneumatic power and the valves controlling the power form no part of the present invention. Suffice it to say that 13 is the control panel subject to manipulation by the operator.

14 is a wiper bar supported on arms 15 pivoted at 16 on the press bar 6 having a wiper surface 17. Two-way cylinders 18 pivoted one on each of the levers 8 are connected by piston rods 19 to the wiper bar 14 and connected to the intake and exhaust pipe system 12.

The preformed core is illustrated at 20, 21 in this case being of two parts, there being a clearance 22 between their edges. The core 20 is beaded as at 23 and the core 21 is curved as at 24. The plastic sheet 25 which before it was placed upon the platen 1 was glued or cemented to the horizontal surfaces of the core parts 20, 21, the sheet projecting laterally beyond the curved face 24 and inclined upwardly as indicated at 26 tangent to the bead 23. This partially assembled core and sheet have been placed on the platen or work table 1, the heater 27 supported on swinging arms 28 from an abutment 29 on the cross arms 4 is moved to engage the plastic immediately adjacent the bead. The heater is electric and raises the temperature of the plastic to the desired point. Meanwhile, the press bar has been raised away from the platen.

As soon as the desired temperature of the plastic has been reached, the heater is swung away in counter clockwise direction, the cylinders are caused to move the press bar down into firm contact with the plastic sheet and the cylinders 18 rotate the wiping bar 14 into the dotted line position as shown, bending the heated plastic around the bead. The plastic is held in that position until it is set and the cement applied to the face of the bead or the plastic has hardened to hold the plastic sheet in desired position, with the plastic sheet curved about and conforming to the curved surface of the bead 23.

Thereafter the press bar 6 having been withdrawn, the core with the plastic sheet still on top of it is rotated to bring the part 21 into register with the rear boundary of the platen 1. Heat is again applied, the press bar is manipulated to hold the core in place and the sheet is wiped around the curved face 24.

Thereafter the cylinders are caused again to draw the pistons 19 and 11 upwardly, the still partially assembled core and sheet are removed and reversed into the position shown in FIGURE 4 with the clearance 22 in line with the shoe 30. The press bar 6 is again brought into engagement, this time with the core, the plastic sheet being below. The back bend bar 31 is rotated from its dotted line position of FIGURE 1 to the full line position of FIGURE 4 and when the wiping bar is rotated about its pivot 16, the back bend bar engages the underside of the bead and bends the plastic sheet into the desired position as shown in dotted line.

Thereafter with the plastic sheet in the position shown in FIGURE 5, the beading 32 is inserted into the space now left by the bending apart of the two elements of the core, the bead being held by pins or screws 33, 34 engaging the two parts of the core, thus locking the core and the cover plate in fixed position.

We claim:

1. A press for the post forming of plastic objects including a fixed flat work table, supports therefor, columns upwardly extending above the level of the table and spaced from the edge thereof, a press bar, arms pivotally supporting the press bar on the columns, means for rotating said arms to cause the press bar to come into and out of contact with work on and adjacent the edge of the table, a wiping bar associated with the press bar and means operative after the press bar has seated on the work for exerting a pressure adapted to wipe a plastic sheet about the edge of the work.

2. A press for the post forming of plastic objects including a fixed flat work table, supports therefor, columns upwardly extending above the level of the table and spaced from the edge thereof, a press bar, arms pivotally supporting the press bar on the columns, means for rotating said arms to cause the press bar to come into and out of contact with work on and adjacent the edge of the table, a wiping bar associated with the press bar and means operative after the press bar has seated on the work for exerting a pressure adapted to wipe a plastic sheet about the edge of the work, means movably supported in register with the table for heating a plastic sheet adjacent the edge of the work.

3. A press for the post forming of plastic objects including a fixed, flat table, columns extending upwardly thereabove, spaced from the edge thereof, a press bar, arms pivoted on the columns supporting the press bar, means for rotating said arms to move the press bar toward and away from the table adjacent the edge thereof, a wiping bar pivoted on the press bar, means for moving the wiping bar when the press bar is presented to the work downwardly across the edge of the table.

4. A press for the post forming of plastic objects including a fixed, flat table, columns extending upwardly thereabove, spaced from the edge thereof, a press bar, arms pivoted on the columns supporting the press bar, means for rotating said arms to move the press bar toward and away from the table adjacent the edge thereof, a wiping bar pivoted on the press bar, means for moving the wiping bar when the press bar is presented to the work downwardly across the edge of the table, the means for moving the press bar and the wiping bar including fluid actuated pistons and means for controlling them.

5. A press for the post forming of plastic objects including a fixed, flat table, columns extending upwardly thereabove, spaced from the edge thereof, a press bar, arms pivoted on the columns supporting the press bar, means for rotating said arms to move the press bar toward and away from the table adjacent the edge thereof, a wiping bar pivoted on the press bar, means for moving the wiping bar when the press bar is presented to the work downwardly across the edge of the table, the means for moving the press bar and the wiping bar including fluid actuated pistons and means for controlling them, the pistons associated with the press bar being interposed between the column and the press bar, the pistons controlling the wiping bar, being interposed between the arms supporting the press bar and the wiping bar.

6. In combination, a fixed flat work table, a press bar and means for removably holding it against and applying pressure toward the work table along a line generally perpendicular thereto adjacent the edge thereof, a wiping bar pivotally supported on the press bar and means for rotating it about its pivot support to cause it to travel in an arc starting above and ending below the level of the table, a finger pivoted on the wiping bar and mounted so as to selectively project forwardly from and lie rearwardly of the working face of the wiping bar.

7. A press for the post forming of plastic objects including a fixed flat, generally horizontally disposed work table having at least one edge exposed, a supporting column extending upwardly, spaced beyond the edge to a point well above the level of the table, a lever pivoted on the column above the level of the table, a press bar carried by the lever, means interposed between the lever and the column for positively moving the press bar toward and from the table, the length of the lever being such that when the press bar is presented to the table it is adjacent but inside the edge thereof, a wiping member pivoted on the press bar, extending beyond the edge of the table and means interposed between the wiping member and the lever to rotate the wiping member downwardly around the edge of the table, a heating member pivoted on the table support movable into and out of register with the edge of the table at a point above and outside the table edge.

8. A press for the post forming of plastic objects including a fixed, flat, generally horizontally disposed work table having at least one edge exposed, a supporting column extending upwardly, spaced beyond the edge to a point well above the level of the table, a lever pivoted on the column above the level of the table, a press bar carried by the lever, means interposed between the lever and the column for positively moving the press bar toward and from the table, the length of the lever being such that when the press bar is presented to the table, it is adjacent but inside the edge thereof, a wiping member pivoted on the press bar, extending beyond the edge of the table and means interposed between the wiping member and the lever to rotate the wiping member downwardly around the edge of the table, a heating member pivoted on the table support movable into and out of register with the edge of the table at a point above and outside the table edge, a back bent bar pivotally mounted on the wiping lever adapted to extend downwardly below the edge of the table when the wiping member is moved downwardly.

References Cited in the file of this patent

UNITED STATES PATENTS

| | | |
|---|---|---|
| 198,780 | Swartz et al. | Jan. 1, 1875 |
| 482,782 | Burkhardt | Sept. 20, 1892 |
| 1,407,979 | Bishop | Feb. 28, 1922 |
| 2,175,679 | Beatty | Oct. 10, 1939 |
| 2,203,027 | Onsrud | June 4, 1940 |
| 2,350,915 | Miller | June 6, 1944 |
| 2,446,038 | Amigo | July 27, 1948 |
| 2,648,370 | Beach | Aug. 11, 1953 |
| 2,739,637 | Tyler | Mar. 27, 1956 |
| 2,661,789 | Keller | Dec. 8, 1953 |
| 2,739,636 | Tyler | Mar. 27, 1956 |

FOREIGN PATENTS

| | | |
|---|---|---|
| 500,443 | Italy | Nov. 18, 1954 |
| 2,744,850 | Schofield | May 8, 1956 |